Aug. 20, 1935.  G. J. THOMAS  2,011,921
BRAKE TESTING APPARATUS
Filed May 14, 1929  4 Sheets-Sheet 1
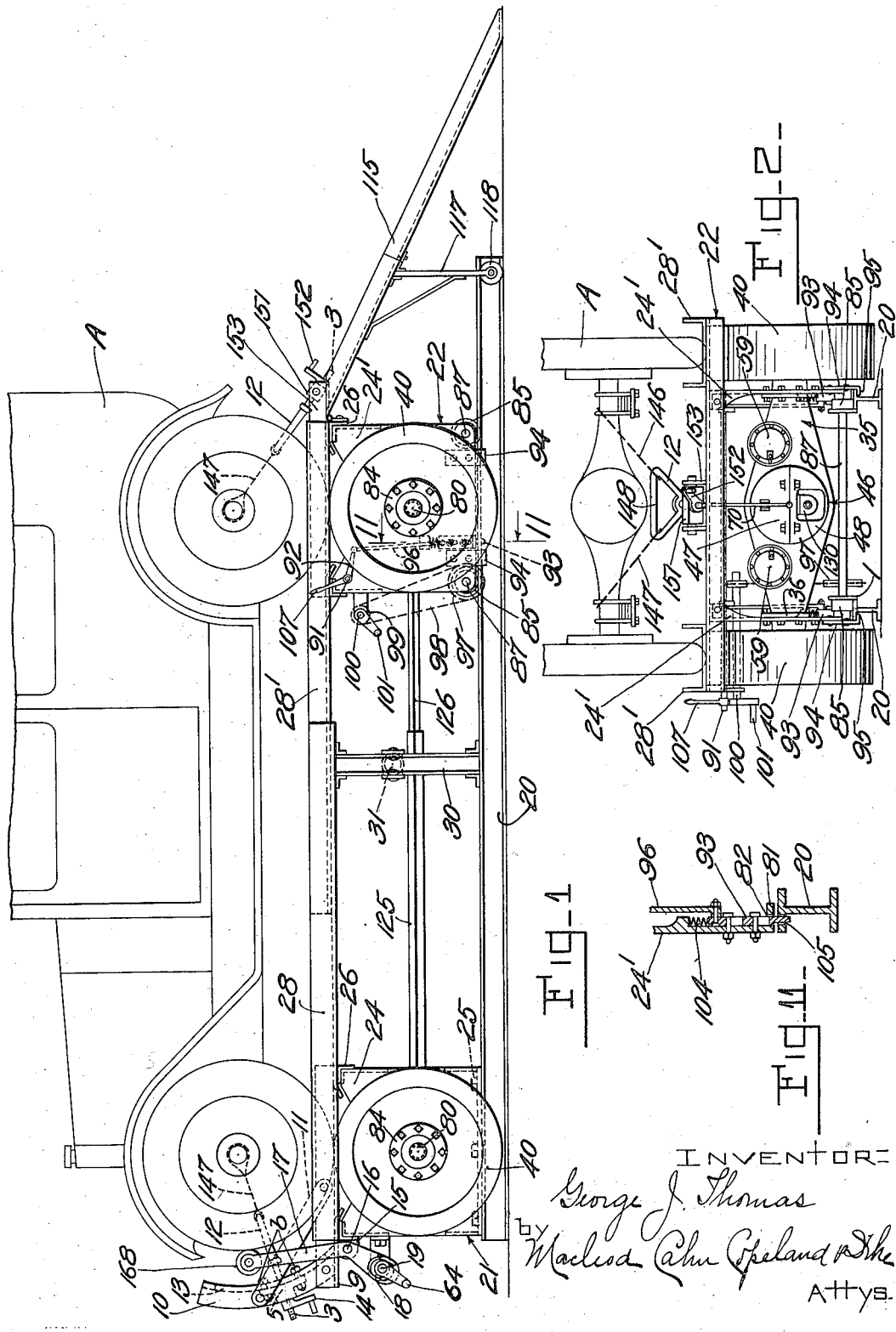

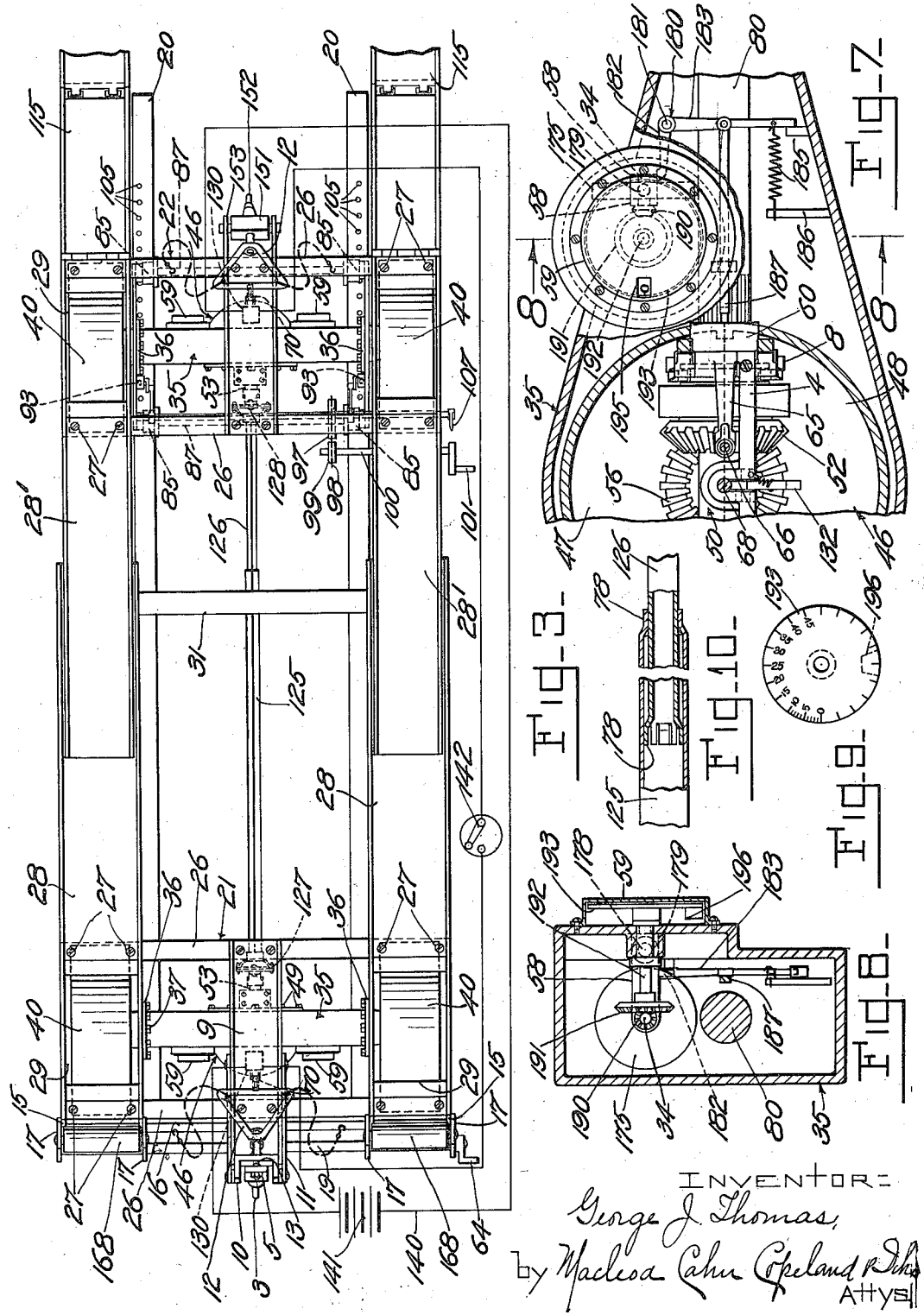

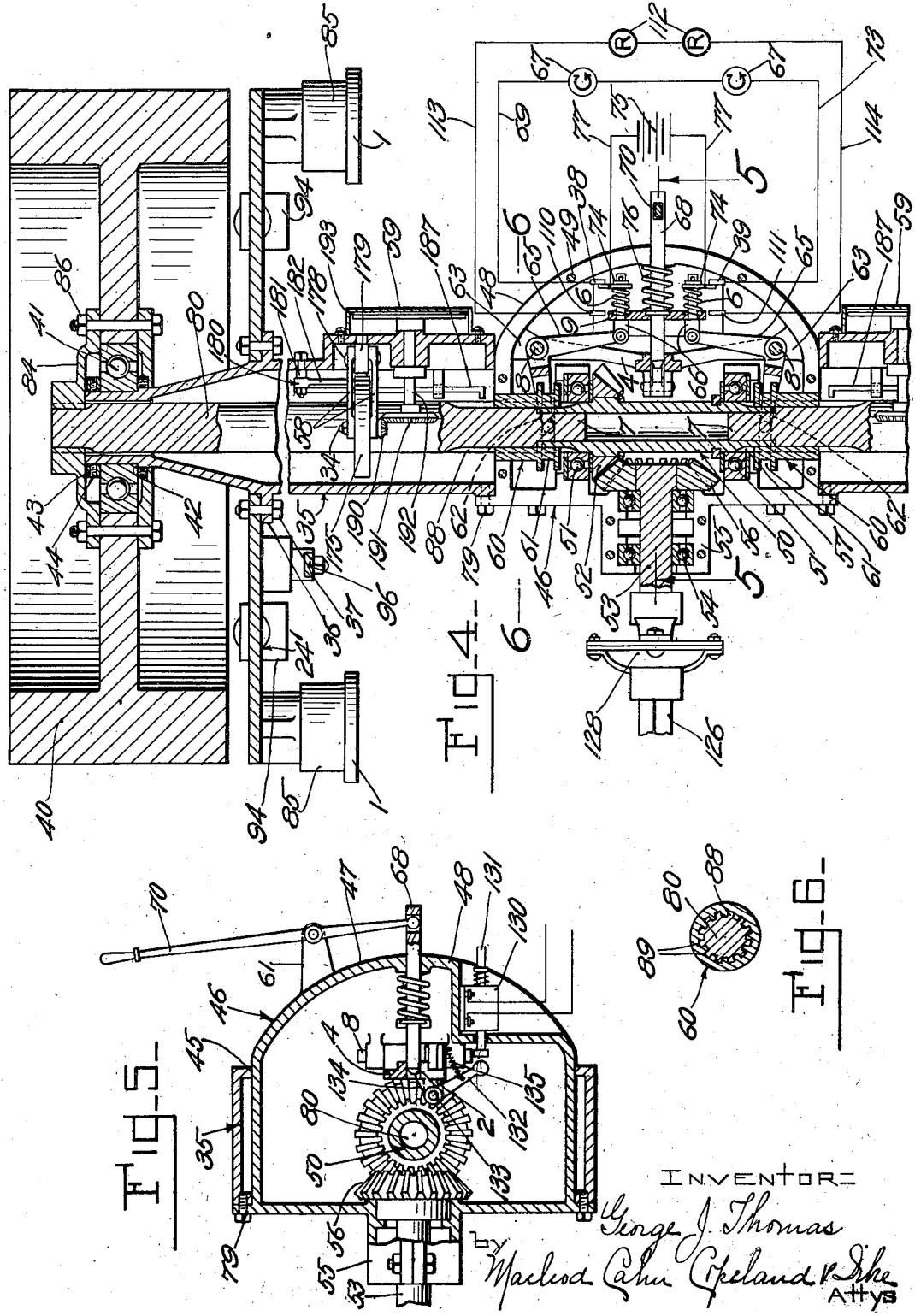

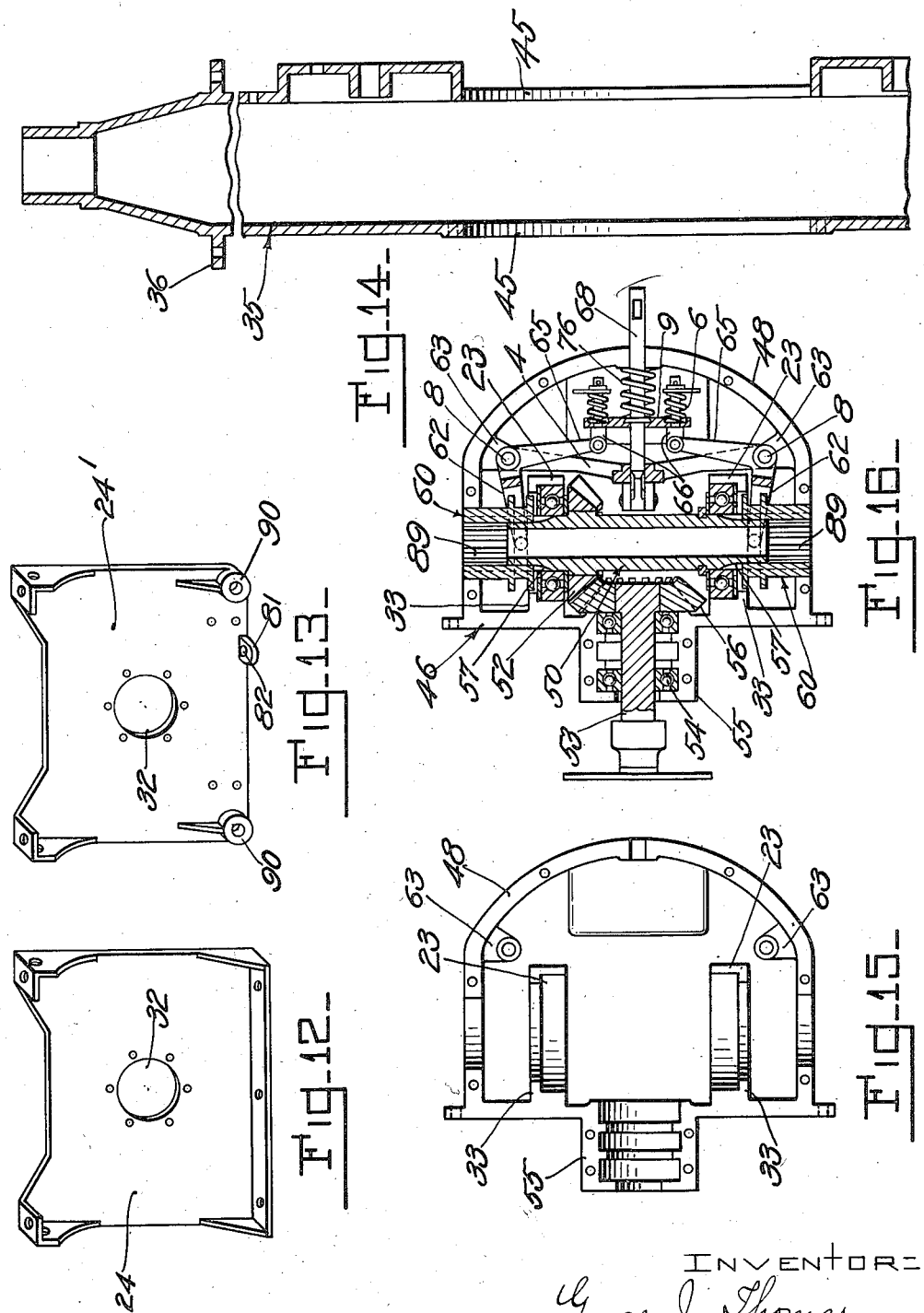

Patented Aug. 20, 1935

2,011,921

UNITED STATES PATENT OFFICE 2,011,921

BRAKE TESTING APPARATUS

George J. Thomas, South Bend, Ind., assignor to Brake Synchrometer Co., Boston, Mass., a corporation of Massachusetts Application May 14, 1929, Serial No. 363,078

10 Claims. (Cl. 73—51)

This invention relates to apparatus for testing the efficiency of vehicle brakes of the type in which a plurality of rotors are provided adapted to receive and support the vehicle wheels and which are adapted to be connected to equalize their speed and to be disconnected so that they may run independently and thus enable the efficiency of each brake to be determined independently. In this type of machine the rotors may be arranged as or to rotate in harmony with momentum wheels to store kinetic energy and thus render the conditions under which the test is made similar to the conditions encountered when the vehicle is moving on the road. The vehicle is anchored at the front and rear ends in order to maintain its wheels in engagement with the rotors.

When the vehicle on the apparatus and the wheels are started rotating in harmony with the rotors the vehicle tends to move forward exerting a pull upon the mechanism for anchoring the rear end of the vehicle and relieve the strain upon the mechanism for anchoring the front end of the vehicle. However, when the vehicle brakes are applied the opposite action takes place and the strain is placed upon the mechanism for anchoring the front end of the vehicle. In using an apparatus of this type it is common practice to rotate the vehicle wheels in harmony with the rotors at a rate equivalent to the travel of the vehicle upon the road at a speed of thirty miles or more an hour. It can be appreciated that when the vehicle brakes are applied after the vehicle wheels and rotors are rotating in harmony at such a rate that the strain set up in the mechanism for anchoring the front end of the vehicle is enormous. This sudden strain has the tendency to lift the front end of the apparatus and if the anchoring mechanism inclines downwardly there is a tendency to increase the traction between the vehicle wheels and the rotors.

In testing the brakes of vehicles of varying wheel base it is necessary to adjust the relative longitudinal position of the rotors supporting the vehicle wheels. In order to accomplish this it has been necessary in machines as constructed heretofore to mount the front rotors in an adjustably movable frame in spite of the fact that enormous forces are created during the test which tend to raise or turn the front portion of the frame. On account of these forces, it has been necessary to construct the movable front frame very heavy in order to overcome its tendency to rise or turn while the test is being made. Machines of this type, therefore, have been very heavy and on account of the construction heretofore considered essential have been very expensive to manufacture. As a result their cost to purchasers has been very high and consequently their use has been limited. Moreover, it has been a difficult and expensive operation to set up and install these machines and has required the services of a highly skilled man. These machines often have required expensive servicing which has rendered their manufacture unattractive financially.

I have discovered that the necessary weight of a brake testing apparatus of this type can be reduced greatly and consequently lower the cost of production by securing the front portion of the frame to the foundation and arranging the rear portion of the frame for movement relative thereto. In accordance with the invention the apparatus is so constructed that it may set up quickly and thus lower the cost of installation. Furthermore, the apparatus embodies certain refinements enabling the test of the brakes to be made quicker and more easily.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawings; in which:

Fig. 1 is an elevational view of an apparatus embodying the invention showing a vehicle positioned thereon for the test;

Fig. 2 is an end elevation of the same as viewed from the right of Fig. 1, the inclined ways being omitted;

Fig. 3 is a plan view of the apparatus with the clutch operating circuit shown in diagram.

Fig. 4 is a fragmentary sectional view showing in detail the mounting for the rotors and in diagram the device for indicating when alined shafts are connected or disconnected;

Fig. 5 is a sectional view taken upon the line 5—5, Fig. 4.

Fig. 6 is a section through the clutch mechanism taken on line 6—6, Fig. 4.

Fig. 7 is a fragmentary detail view in elevation of the counter mechanism.

Fig. 8 is a sectional view taken on line 8—8, Fig. 7;

Fig. 9 is a detail view of the dial;

Fig. 10 is a detail view in section of the telescoping driving shaft connecting the front and rear units;

Fig. 11 is a detail sectional view taken on the line 11—11, Fig. 1;

Figs. 12 and 13 are perspective views respectively of the front and rear upright supporting member;

Fig. 14 is a fragmentary sectional view of the shaft housing;

Fig. 15 is a detail of the lower portion of the clutch casing;

Fig. 16 is a similar view showing the clutch mechanism and associated parts mounted therein.

A machine constructed in accordance with the provisions of the invention is illustrated in the accompanying drawings and comprises parallel longitudinal supports 20, such as I-beams, supporting a stationary front frame 21 and a movable rear frame 22, the general construction of which is similar. The frame 21 comprises an upright support 24 (see particularly Fig. 12) preferably of cast steel, secured in a similar position on each of the supporting members 20, as by bolts 25. Cross members 26 such as angle bars, extend over the uprights 24 and are secured thereto as by bolts 27 and carry the forward ends of spaced channel members 28 forming runways for the vehicle wheels. The rear ends of the channel members 28 are supported upon the members 20 by uprights 30 which are connected by a cross member 31. The uprights 24 are provided with openings 32 to receive the housing 35 which extends between and outwardly beyond the uprights 24 and is provided with flanges 36 which are secured to the uprights 24, as by bolts 37 (see Fig. 3). A rotor 40 adapted to store sufficient kinetic energy for the purpose of the test is rotatably mounted on anti-friction bearings 41 at opposite ends of the housing 35 and projects upwardly through openings 29 in the members 28. The bearings 41 are held against a shoulder 42 on the housing 35 by a collar 43 secured upon the housing as by set screws 44.

The housing 35 is provided with a transverse opening or passage 45 adapted to receive a casing 46, which may be detachably secured to the housing, as by bolts 79. To facilitate assembly and installation of the apparatus the casing 46 is composed of upper and lower portions 47 and 48 respectively which may be secured together as by bolts 49. A hollow male clutch member 50 is supported in suitable anti-friction bearings 51 shimmed in a support 23 formed in a web 33 within the casing 46 and is provided with a bevel gear 52. A transverse shaft 53 is supported for rotation in suitable roller bearings 54 shimmed in an annular projection 55 on the casing 46 and is provided at its inner end with a bevel gear 56 adapted to mesh with the bevel gear 52. Female clutch members 60 are grooved internally to receive the splines 57 on opposite ends of the clutch member 50 and each is provided with an annular groove 61 adapted to receive a fork 62 forming one arm of a bell crank. The bell cranks are pivotally mounted upon pins 8 carried by a bracket 4 detachably mounted in lugs 63 projecting inwardly from the casing 46. The other arm 65 of the bell crank is pivotally connected with a rod 66 slidably mounted in a plate 9 fixed upon a bar 68 slidably mounted in the casing and extending outwardly therefrom. To the outer end of the bar 68 is pivotally connected an operating lever 70 which is pivotally carried by lugs 71 on the casing 46. A spring 6 surrounds each of the rods 66 with one end abutting the plate 9 and the other end engaging a collar 74 held upon the rod 66 by a cotter pin. A spring 76 surrounds the bar 68 and extends between the casing 46 and the plate 9. The inner end of the bar 68 is supported in a bearing formed in the bracket 4. Alined shafts 80 each are provided with a reduced portion 7 adapted to be received in opposite ends of the member 50 which serves as a bearing therefor. The other end of each of the shafts 80 has shrunk thereon a drive plate 84 which is secured to one of the rotors 40, as by bolts 86. A plurality of splines 88 formed on each of the shafts 80 near the inner end thereof are adapted to be received by the grooves 89 of the female clutch member 60 for sliding engagement therewith.

In accordance with the invention the rear frame is mounted for movement toward and away from the front frame. The construction of this frame is similar to the construction of the front frame but instead of securing the supports 24′ of the rear frame to the I-beams 20, rollers 85 having flanges 1 adapted to engage the I-beams 20 are mounted upon shafts 87 extending transversely between opposite uprights 24′ and rotatably mounted in bearings 90 therein. One of these shafts is provided with a sprocket wheel 97 which is connected by a chain 98 to a sprocket wheel 99 carried by a shaft 100 rotatably mounted in the rear frame and which may be rotated in any suitable manner, as by a crank 101. The rear frame may be locked in any predetermined position by a suitable locking mechanism engaging the support 20. For this purpose, as illustrated, a latch 93 is slidably mounted upon each of the uprights 24′ which is provided with a lug 81 having an opening 82 to receive the same. The latch is pressed downwardly by a spring 104 to engage any one of the openings 105 in the top of the I-beam 20. A link 96 is pivotally connected at one end to the slide 93 and at its other end to an arm 92 secured to a cross shaft 91 rotatably mounted in the uprights 24′. An operating handle 107, rigidly secured to the shaft 91 serves as means to release the latches 93 for the purpose of shifting the rear frame 22. Any tendency of the rear frame to rise from the rails 20 is prevented by brackets 94 secured to the uprights 24′ and having inturned flanges 95 engaging the under surface of the rails 20 (see Fig. 2). The front ends of the ways 28′ of the rear frame fit within the rear ends of the ways 28 of the front frame and slide thereupon when the rear frame is moved relative to the front frame. An inclined runway 115 in alinement with each of the ways 28′ is secured to the rear frame 22, the opposite or lower end of each runway terminating adjacent the floor. A bracket 117 is secured to each of the runways 115 at an intermediate point thereon and is provided at its lower end with a roller 118 adapted to engage and move along the floor.

Inasmuch as it is essential in making a brake test that the alined shafts 80 may be positively connected in order to equalize the peripheral speed of the rotors 40 and disconnect them when the brakes are being applied an indicator is provided in accordance with the invention which will indicate to the operator when the alined shafts 80 are connected and disconnected. In accordance with the invention this indicator is actuated by the operation of the clutch operating mechanism and for this purpose contacts 110 and 111 are provided within each casing 46 adjacent the plate 9. The contacts 110 and 111 are connected with red lamps 112 by conductors 113 and 114 respectively. Contacts 38 and 39 are also provided within each of the casings 46 and are connected with green lamps 67 by electrical conductors 69 and 73 respectively. A suitable source of electrical power, herein shown as a battery 75 is connected by electrical conductors 77 to each of the collars 74, the latter projecting to engage either the contacts 38 and 39 or the contacts 110 and 111 depending upon whether the clutch is engaged or disengaged.

In order to connect the shafts 80 of the front and rear units to rotate in synchronism, suitable driving connections are provided therebetween comprising a hollow shaft 125 of rectangular cross section adapted to receive for sliding engagement therewithin a shaft 126 of rectangular cross section. The outer end of the shaft 125 is connected by a universal joint 127 to the shaft 53 of the front unit whereas the outer end of the shaft 126 is connected by a universal joint 128 to the shaft 53 of the rear unit. Preferably each of the shafts 125 and 126 are provided with resilient members 78 (Fig. 10) adapted to engage the other and prevent wobbling and rattling.

A suitable mechanism is provided for throwing out both clutches of the front and rear units simultaneously in order to permit each of the rotors 40 to rotate independently by the kinetic energy stored therein. The mechanism illustrated for this purpose comprises a solenoid 130 (see particularly Fig. 5) suitably supported on the exterior of each casing 46 and provided with a core 131 projecting through said casing and adapted to move to engage the depending arm 132 of a bell crank pivotally mounted upon a pin 133 in the bracket 4. The other arm 134 of the bell crank is adapted to be moved into and out of the path of the rod 68 to engage the inner end of said rod when the clutches are engaged. The arm 134 of the bell crank normally is held in this position by a spring 135 extending between the arm 132 and a projection on the bracket 4. The movement of the bell crank due to the action of the spring 135 is limited by a pin 2 projecting from the bracket. The solenoids on each of the casings 46 are connected in series in a common electrical circuit 140 including a suitable source of electrical power, such as a battery 141, and a manually operable switch 142 which is portable and may be carried to any desired position by the operator. During the test of the vehicle brakes the switch 142 may be held by the operator and actuated by him as he applies the brakes.

In order to support the vehicle A with the wheels thereof supported upon the rotors 40 suitable anchoring mechanism is provided at the front and rear of the apparatus. The anchoring mechanism at both the front and rear (see Figs. 1, 2 and 3) includes separate chains 146 and 147 secured to and extending from near opposite ends of the front axle of the vehicle and from the rear axle housing. The other ends of each set of chains 146 and 147 are secured to a separate frame 12 which, in the form illustrated, is triangular in shape with its apex loosely connected to one end of a screw 3. In the mechanism for anchoring the rear end of the vehicle the screw 3 passes loosely through an opening in a block 151 secured in a channel member 153 extending rearwardly from the rear frame 22 and secured to the cross members 26 thereof. A crank 152 is threaded upon the screw 3 and is adapted to engage the block 151 to move the screw 3 therethrough and place the chains 146 and 147 under equal tension. If the mechanism above described was employed for both the front and rear ends of the vehicle there would be a tendency, when the vehicle brakes were applied, exerted by the anchoring mechanism to increase the traction between the vehicle wheels and rotors supporting them. This would be objectionable and for this reason means are provided for anchoring the front end of the vehicle so that the strain on the anchoring means may be exerted in a substantially horizontal direction. For this purpose, a channel member 9 is secured upon the cross members 26 of the front frame 21 so as to extend forwardly therefrom. A curved channel support 10 is secured upon the channel member 9 and braced thereon by brackets 11. The support 10 is curved, preferably in the form of an arc substantially concentric with the front vehicle wheels when the vehicle is operatively positioned on the machine, and is provided with an elongated slot 13 in the rear wall thereof. A block 5 is adjustably mounted on the support 10 by bolts b passing through the slot 13 thereof and is provided with an opening to receive loosely the screw 3. A crank 14 is threaded upon the screw to engage the block 5.

An adjustable stop is provided for positioning the vehicle upon the rotors 40. For this purpose, spaced brackets 15 are suitably secured to the front frame 21 and serve as bearings for a cross shaft 16. Levers 17 are loosely mounted upon the shaft 16 in spaced relation and are provided at their upper ends with bearings for rolls 168 adapted to engage the front wheels of the vehicle. The lower ends of the levers 17 are provided with openings to receive eccentrics 18 mounted on a cross shaft 19 journalled in brackets projecting from the front frame 21. A crank 64 is fixed upon one end of the shaft 19 to turn the eccentrics 18 and thereby move the rolls 168 laterally towards or away from the vehicle wheels.

A mechanism is provided for counting the number of revolutions or distance of travel of the vehicle wheels after the brakes are applied. In the form illustrated this mechanism is enclosed within the housing 35 for each shaft 80 and comprises a friction wheel 175 (see Figs. 4, 7 and 8) rotatably mounted upon a shaft 34 extending between the free ends of arms 58, the other ends of which are pivotally mounted upon a stud 178 in a lug 179 detachably carried by the housing 35. A bell crank lever 180 is pivotally mounted upon a stud 181 detachably mounted in the housing 35 with one arm 182 arranged to engage one of the arms 58 supporting the wheel 175. The other arm 183 of the bell crank 180 extends downwardly and is connected with one end of a spring 185, the other end of which is secured to a stud 186 fixed in the housing. A plunger 187 is secured at one end to the arm 183 and extends through a suitable guide in the housing 35 with its free end adjacent the clutch member 60. The shaft 34 is provided with a bevel gear 190 adapted to mesh with a bevel gear 191 carried by a shaft 192 rotatably mounted in the housing 35 and extending therethrough. A dial 193 is mounted upon the outer end of the shaft 192 and is provided with a suitable scale for indicating the distance of travel of the vehicle wheels. A cover or casing 59 (see also Figs. 2 and 3) is secured on the housing 35 to enclose the dial 193 and is provided with an opening 195 (see particularly Fig. 7) positioned opposite the point normally occupied by the zero point on the dial when the latter is in an inoperative position. The dial 193 is provided with a weight 196 adapted normally to maintain the dial in a predetermined position.

In assembling or installing the apparatus, the mechanism which is carried within the casing 46 is assembled in the lower portion 48 thereof, as shown most clearly in Fig. 16. The upper portion 47 is then secured to the lower portion 48 to provide a completely assembled unit which can be inserted in the passage 45 of the shaft housing 35 readily and secured to said housing.

In the use of the apparatus the position of the rear frame 22 is adjusted to space the front and rear rotors apart a distance corresponding to the wheel base of the vehicle the brakes of which are to be tested. In so doing the handle 107 is moved to disengage the latches 93 from the rails 20 and the crank 101 is rotated to cause rotation of the rolls 85 upon said rails. When the rear frame has been moved to the proper position the handle 107 is released and the latches 93 forced into one of the openings 105 in the rails 10 by the springs 94. It will be understood that the rolls 168 may be brought to their proper position for the vehicle to be tested prior to placing the vehicle upon the apparatus. The vehicle is driven up the inclined runways 115 to bring the front wheels in engagement with the rolls 168. The front and rear ends of the vehicle are then suitably anchored to the apparatus by the mechanism described. In so doing it is often desirable to adjust the block 5 so that the front anchoring mechanism will be positioned substantially in a horizontal plane and thereby reduce to a minimum the tendency to increase the traction between the vehicle wheels and the rotors due to the forces created by the application of the vehicle brakes as hereinbefore described. The crank 64 is then turned to cause the rolls 168 to move forward away from the front wheels of the vehicle.

The alined shafts 80 are then connected by moving the clutch members 60 by the movement of the operating levers 70. The fact that the clutches have been connected properly with the alined shafts 80 will be indicated if the circuit through the green lamps indicated by the reference characters 67 and the letters G in Fig. 4 have been closed. The vehicle wheels and rotors 40 are then rotated in unison preferably by power derived from the vehicle motor until they have obtained a speed equivalent to the travel of the vehicle upon the road at the rate of thirty or more miles an hour. The operator sitting in the driver's seat of the vehicle then applies the vehicle brakes and at the same time closes the switch 142 to actuate the solenoids 130 to throw out the clutches and permit the alined shafts 80 to rotate independently. As each clutch member 60 is thus disengaged it strikes the plunger 187 to turn the arm 182 of the bell crank 180 downwardly out of engagement with the arms 58 supporting the friction wheel 175 thereby permitting the friction wheel 175 to come into frictional contact with its corresponding shaft 80 and operate the counter mechanism to indicate the distance of travel of the vehicle after the brakes are applied.

What I claim is:

1. In an apparatus for testing the brakes of a vehicle, the combination of a frame including an elongated housing, a rotor mounted for rotation on said housing at each end thereof, alined shafts within said housing, driving connections between the outer end of each shaft and the rotor adjacent thereto, and means for connecting and disconnecting said shafts.

2. In an apparatus for testing the brakes of a vehicle, the combination of a frame including a housing provided with a transverse passage, alined shafts in said housing on opposite sides of said passage, a casing in said passage detachably secured to said housing, and means carried by said casing for connecting and disconnecting said shafts.

3. In an apparatus for testing the brakes of a vehicle, the combination of a frame including an elongated housing, a rotor mounted for rotation on said housing at each end thereof, alined shafts within said housing, driving connections for separately connecting said rotors with said shafts, male and female clutch members within said housing adapted to connect and disconnect said alined shafts, a transverse shaft mounted in said housing, intermeshing gears on said transverse shaft and male clutch member, and means for engaging and disengaging said clutch members.

4. In an apparatus for testing the brakes of a vehicle, the combination of a frame including a housing provided with a transverse passage, alined shafts in said housing on opposite sides of said passage, a casing in said passage detachably secured to said housing, means mounted in said casing for connecting and disconnecting said shafts comprising a clutch, a pivotally mounted lever connected with said clutch, a movable member, means for resiliently connecting said member and lever, means for moving said member to operate said clutch, and a spring for moving said member to disengage said clutch.

5. In an apparatus for testing the brakes of a vehicle, the combination of a frame including a housing provided with a transverse passage, alined shafts in said housing on opposite sides of said passage, a casing in said passage detachably secured to said housing, means mounted in said casing for connecting and disconnecting said shafts comprising a clutch, a pivotally mounted lever connected with said clutch, a movable member, means for resiliently connecting said member and lever, means for moving said member to operate said clutch, a spring for moving said member to disengage said clutch, a lock adapted to engage said member, and means for actuating said lock whereby said clutch is disengaged by the action of said spring.

6. In an apparatus for testing the brakes of a vehicle, the combination of a frame including a housing provided with a transverse passage, alined shafts in said housing on opposite sides of said passage, a casing in said passage detachably secured to said housing, male and female clutch members adapted to connect said shafts, means for moving said clutch members relatively into and out of engagement, a transverse shaft, and intermeshing gears on said transverse shaft and one of said clutch members.

7. In an apparatus for testing the brakes of a vehicle, the combination of relatively movable front and rear frames each including an elongated housing, a rotor mounted for rotation on each end of each housing, alined shafts within said housings, driving connections for separately connecting said rotors with said shafts, male clutch member between said shafts, female clutch members adapted to connect said male clutch member with said shafts, a transverse shaft mounted in each of said housings, a gear on each of said transverse shafts within said housings, a gear adapted to mesh therewith mounted on said male clutch members, and telescoping connections of rectangular cross section between said shafts.

8. In an apparatus for testing the brakes of a vehicle, the combination of spaced longitudinally extending supports, front and rear frames each including an upright similarly positioned on each of said supports, cross members connecting similarly positioned supports and extending outwardly therefrom, longitudinally extending channel members carried by said cross members, an elongated housing extending through and connected to similarly positioned uprights, a rotor mounted for rotation on each end of each housing, means for connecting and disconnecting said rotors, means for securing said front frame to said supports, and means for mounting said rear frame for movement on said supports.

9. In an apparatus for testing the brakes of a vehicle, the combination of a frame, a pair of rotors rotatably mounted in said frame adapted to receive the wheels of a vehicle, and means for anchoring a vehicle on said rotors comprising a screw, a member pivotally connected to said screw, and a chain connected to and extending from the vehicle near opposite sides thereof and connected to said member, and an adjustable connection between said screw and frame comprising a support extending upwardly from said frame, a block adjustably mounted on said support, and means for adjusting said screw relative to said block.

10. In an apparatus for testing the brakes of a vehicle, the combination of a frame, alined shafts mounted in said frame, a clutch for connecting and disconnecting said shafts, a rotor connected with each of said shafts adapted to receive a vehicle wheel, a counter mechanism for each of said shafts including a rotatable member adapted to be moved into and out of rotative connection with said shaft, a rotatable indicator, driving connections between said member and indicator, and means positioned in the path of movement of said clutch adapted to be actuated thereby to cause engagement of said member with said shaft.

GEORGE J. THOMAS.